United States Patent Office 3,810,970
Patented May 14, 1974

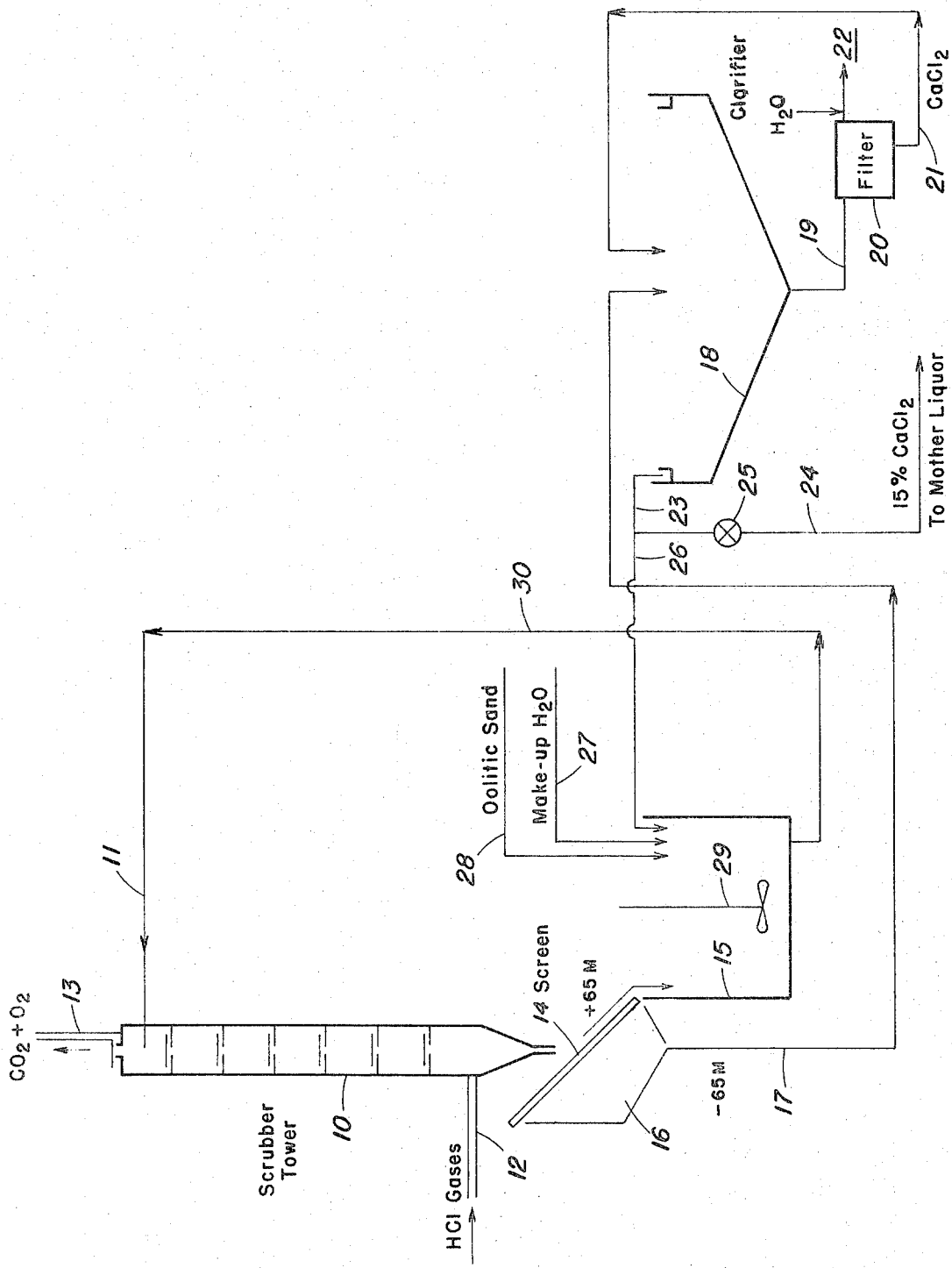

3,810,970
PROCESS FOR SCRUBBING HYDROGEN CHLO-
RIDE FROM WASTE GASES AND SELECTIVE
RECOVERY OF ANHYDROUS MAGNESIUM
CHLORIDE
Walter R. McCormick, Salt Lake City, Utah, assignor to
N L Industries, Inc., New York, N.Y.
Filed Jan. 19, 1972, Ser. No. 219,095
Int. Cl. C01b 7/08; C01f 5/30
U.S. Cl. 423—498                       7 Claims

ABSTRACT OF THE DISCLOSURE

Hot waste gases containing small amounts of hydrogen chloride plus additional combustion products including carbon dioxide, nitrogen, oxygen and water vapor are scrubbed substantially free of the hydrogen chloride by contacting the hot gases with a fluid scrubbing medium comprising a slurry of oolitic sand and calcium chloride brine at a pH less than 7, whereby the hydrogen chloride in the gases is converted to additional calcium chloride brine which is separated and recovered from the fluid scrubbing medium, the latter being fortified by a minor portion of the recovered brine and recycled to scrub additional hot waste gases.

The system employed comprises a scrub tower in which the fluid scrubbing medium and hot waste gases are brought into intimate contact, preferably by countercurrent flow; and suitable means for separating and recovering the newly formed calcium chloride brine from the fluid scrubbing medium including means for recovering the oolitic sand and mixing it with make-up brine to form fresh fluid scrubbing medium which is recycled to the scrub tower.

BACKGROUND OF THE INVENTION

The selective recovery of salts from naturally occurring brines as found in the oceans, inland seas, salt lakes, salt wells and the like disposed upon the Earth's surface has been a challenge to industry for many years. While such brines contain sodium chloride as the major constituent together with lesser but nevertheless substantial amounts of the chlorides and/or sulfates of potassium and magnesium as the principal remaining salts—and hence are important industrially, their isolation and recovery from brines has not always been the most economical way of obtaining said salts as compared to other sources of supply.

Recently however, a process has been developed for recovery of one or more of these salts from the brines of salt lakes and in particular from the brine of the Great Salt Lake in Utah, U.S.A. This process is described in detail in U.S. Pat. No. 3,516,785 issued Jan. 23, 1970 and relates in particular to the recovery of magnesium chloride from sodium, potassium, magnesium chloride and sulfate containing mixed salt solutions. The process is characterized by successive concentrations of the brine to precipitate predominantly, first, sodium salts and thereafter the potassium-magnesium double salt kainite, desulfating the mother liquor which comprises predominantly magnesium and potassium sulfates by the addition of calcium chloride brine and further concentrating to precipitate the potassium-magnesium double salt carnallite from the mother liquor. The latter is essentially a magnesium chloride solution which is heated to further concentrate the solution after which the concentrated solution is spray dried to form anhydrous magnesium chloride which, in turn, may be converted to magesium metal by electrolysis.

The commercial success of this or any similar process for recovering salts and/or magnesium metal from brines depends largely on making the most effective use of each and every component including reaction products, waste gases and the like involved in the recovery process. This is illustrated in the process of the above identified U.S. patent wherein first and second order concentrations of the magnesium chloride solution are heated to dryness in a spray drier using as the heat source the hot exhaust gases derived from a gas turbine which is used to drive an alternating current generator for generating the electrical energy requirements of the overall process. In the process of spray drying the concentrated solutions of magnesium chloride to dryness a portion of the $MgCl_2$ is decomposed into $MgO$ and gaseous $HCl$ by reaction with the $H_2O$ in the hot exhaust gases. The hot gases leaving the spray drier are recycled to the first and second concentrators where they are used as the heat source for effecting successive concentrations of the magnesium chloride solutions mentioned above. The waste gases from the concentrators have approximately the following analysis on a weight percent basis:

|  | Percent |
|---|---|
| $HCl$ | 0.42 |
| $N_2$ | 70.64 |
| $O_2$ | 16.20 |
| $CO_2$ | 3.74 |
| $H_2O$ | 9.01 |

Inasmuch as it is desirable to remove the $HCl$ from these waste gases before exhausting to the atmosphere they are sent to a scrubber where the $HCl$ is removed from the gases by scrubbing the gases with relatively insoluble calcium carbonate, in the form of oolitic sand, which reacts with the $HCl$ in the waste gases to form $CaCl_2$ brine.

Concerning the use of calcium carbonate, it is well known that calcium anion will react with $HCl$ to produce $CaCl_2$. Experience has shown however that the reaction must take place within a certain pH range i.e. from about 3 to no higher than 7 and preferably about 5.8 to 6.8. If the reaction takes place at a pH above 7 finely divided $CaCO_3$ will form and be deposited in the scrubber thereby impairing its efficiency and eventually plugging it whereas if the reaction takes place at the pH below about 3 less than 100% of the $HCl$ is reacted with the calcium anion. Attempts have been made to use lime (CaO) as a scrubbing medium. However, these have been unsuccessful in as much as the pH of the scrubbing medium has remained high, i.e. above 7, as a consequence of which calcium carbonate is deposited on the scrubber. Oolitic sand, however, is unique in that when used as a slurry to scrub waste gases containing HCl the pH of the slurry will automatcially stabilize itself in the range of from about 5.8 to 6.8, irrespective of variations in flow rates of the oolitic sand slurry and the waste gases, thus insuring 100% removal of the HCl and no deposits of $CaCO_3$ in the scrubber. The conversion of the HCl to brine thus precludes exhausting gaseous HCl into the atmosphere and at the same time provides a source of $CaCl_2$ for desulfating the aforementioned mother liquor.

In this connection, however, it has been found that when using an oolitic sand slurry as scrubbing medium, such as disclosed in the aforesaid U.S. Pat. 3,516,785 only about ⅓ utilization of the oolitic sand is effected in one pass through the scrub tower. Moreover, due to the normally low concentrations of hydrogen chloride (0.35–0.45%) in the waste gases a single pass of the oolitic sand slurry produces a $CaCl_2$ brine of very low calcium chloride concentration, too low in fact to be used to desulfate mother liquor without additional concentration steps being taken.

SUMMARY OF THE INVENTION

The present invention relates in general to an improved process for scrubbing HCl from hot industrial waste gases and in particular the hot waste gases exhausted from concentrators used to concentrate solutions of magnesium chloride produced from salt brines derived from inland salt lakes.

It has now been found that the problems heretofore encountered in scrubbing HCl from these hot waste gases, using oolitic sand as a scrubbing medium, can be effectively overcome by employing an efficient and economical cyclic process wherein a slurry of oolitic sand and calcium chloride brine is continuously recycled through a scrubber concurrently, or countercurrently as the case may be, to the flow therethrough of the hot waste gases. The calcium chloride brine has been found to have no deleterious effect on the scrubbing ability of the oolitic sand and by using this cyclic process substantially 100% of the hydrogen chloride in the waste gases is converted to calcium chloride brine. Moreover, by providing a scrubbing medium comprising the oolitic sand and brine and recycling the scrubbing medium optimum use is made of the oolitic sand and the concentration of the brine is raised to a level at which it can be pumped directly to the mother liquor for desulfating the latter; and for other industrial uses, as the case may be.

DESCRIPTION OF THE DRAWINGS

The drawing is a schemetic illustration of a scrubbing system comprising a scrub tower having means for feeding waste gases and a scrubbing medium thereto; and means for collecting the calcium chloride brine formed therein and recycling fresh scrubbing medium to the tower.

PREFERRED EMBODIMENT OF THE INVENTION

The present invention relates in particular to a cyclic process from removing 100% of the HCl from the hot waste gases derived from a spray drier used for dehydrating hydrous magnesium chloride wherein the hot waste gases are contacted with a continuously recycled scrubbing medium comprising $CaCO_3$ in the form of relatively coarse (+48 mesh) oolitic sand and calcium chloride brine, the latter to be used for desulfating a magnesium sulfate brine sometimes referred to as mother liquor. To this end it is preferred to use a calcium chloride brine of at least about 15% calcium chloride concentration. It will be understood however, that the concentration of the calcium chloride brine is not critical and may be as high as 20% or higher the only criterion being that the concentration be commensurate with the most efficient and economical desulfating of the aforesaid mother liquor. This concentration level will be dependent of course on the size, water balance and other operating factors of a particular plant; and for the particular installation herein described is from about 15% to 20%.

With reference again to the conversion of the HCl in the hot waste gases to a calcium chloride brine, intimate contact between the gases and the scrubbing medium is achieved through the use of a scrubbing tower in which the gases flow preferably counter current to the scrubbing medium. Due to the presence of the oolitic sand in the brine the reaction between the hydrogen chloride in the waste gases and the scrubbing medium is effected at a pH between about 5.8 and 6. Also in the particular embodiment described therein the reaction takes place at elevated temperatures, that is to say in the range of from 90–95° F. which corresponds substantially to the temperature of the waste gases. It will be understood however, that the reaction between the hydrogen chloride in the waste gases and the oolitic sand in the scrubbing medium may be carried out at lower temperatures, if desired.

The reaction between the hydrogen chloride in the waste gases and the calcium carbonate in the scrubbing medium produces additional calcium chloride brine. Initially this will be of relatively low concentration but in accordance with the objects stated above by continuously recycling the brine to the scrubber and bleeding off the product brine at a proper rate the concentration of the $CaCl_2$ brine may be maintained at the level desired for desulfating mother liquor most effectively and economically.

Turning now to the drawing the latter illustrates, schematically, suitable apparatus for achieving the objectives of the invention wherein a scrub tower 10 having from 2–6 disc-and-donut type contractors and packed with Raschig or similar type rings is provided with an inlet pipe 11 at its upper end through which the scrubbing medium, in this case a slurry of oolitic sand (+48 mesh) and calcium chloride brine (15% $CaCl_2$) is fed into the upper end of the scrub tower. Consistent with the preferred method of contacting the scrubbing medium with the waste gases the latter are fed through inlet pipe 12 into the bottom of the scrub tower the flow rate of the gases upwardly in the tower being such that the gases pass upwardly countercurrent to the downward flow of the scrubbing medium. The scrubbing gases, which consist primarily of carbon dioxide, oxygen and nitrogen escape into the atmosphere by way of outlet pipe 13 at the top of the scrub tower.

The specific gas flow rates and rate of flow of the scrubbing medium used to effect 100% removal of HCl from the waste gases will depend upon such factors as the size and design of the apparatus used. However, using the apparatus described herein and shown schematically in the attached drawing, which apparatus is for purposes of illustration and not by way of limitation, the flow rate of the waste gases upwardly through the scrub tower may range from 10–38 s.c.f.m. and preferably about 11.4 s.c.f.m. while the flow rate of the scrubbing medium may vary from 0.74 to about 0.80 g.p.m.

With respect to the flow rate of the gas it has been found that in using the type of scrubber described herein the rate of gas flow bears a substantially linear relationship with the pressure drop in the scrubber. Thus for a gas flow rate from about 22 to about 38 s.c.f.m. the pressure drop in the scrubber increases steadily from about 24 to about 70 inches of water.

Moreover, with respect to the rate of gas flow and the rate of flow of the scrubbing medium it has been found that when using a gas flow rate in the range of about 10–20 s.c.f.m. the flow rate of the scrubbing medium may be substantially constant at 0.5 g.p.m.; that with an increase in gas flow rate to 23 s.c.f.m. the flow rate of the scrubbing medium should be increased to about 0.56 g.p.m.; and that when the gas flow rate is increased to about 32 s.c.f.m. the flow rate of the scrubbing medium should be increased to about 0.8 g.p.m.

During contact of the gases with the scrubbing medium the hydrogen chloride is converted to additional calcium chloride brine which together with the scrubbing medium is discharged from the bottom of the scrub tower onto suitable separating means such as for example a screen 14 which serves to separate the oolitic sand from the brine. In this connection it was found that as the oolitic sand slurry is recycled the particle size of the sand decreases accompanied by a depletion in the $CaCo_3$ content of the sand; and that at about −65 mesh the $CaCO_3$ content of the sand is too low to be effective in the removal of HCl from the waste gases. The screen 14 is therefore of finer mesh i.e. +54, than fresh oolitic sand (+48 mesh) and is set at a suitable angle, which in this embodiment is approximately 45° to the vertical axis of the scrub tower, so that any relatively fresh oolitic sand discharged therefrom onto the screen will be deflected by the screen into a mixing tank 15; while the calcium chloride brine plus any depleted sand i.e. −65 mesh will pass through the screen 14 into a vessel 16 supported directly below the screen 14, or constructed as an integral part thereof as the case may be. The screen 14 and tank 15 thus serve as means for recovering reusable oolitic sand, plus minor amounts of calcium chloride brine clinging thereto, while a major portion of the calcium chloride brine, plus depleted sand, pass through the screen 14 into the vessel 16.

From the vessel 16 the calcium chloride brine, plus depleted sand, flow by gravity or are pumped by way of discharge pipe 17 into the upper end of a clarifier 18 in which the finely divided depleted sand settles out and is discharged from the bottom of the clarifier by way of pipe 19 to a filter 20. Here any residual calcium chloride brine is separated from the depleted sand or other particulate material and recycled by means of pipe line 21 back up into the clarifier 18. The depleted sand and any other particulate solids retained on the filter are removed by periodically flushing the latter with water to form a slurry which is sent to tails 22.

Clarified brine is siphoned or otherwise drawn off from the upper surface of the clarifier by pipeline 23 having branch line 24, provided with valve 25; and branch line 26 arranged to discharge make-up brine directly into mixing tank 15. At start of scrubbing cycle the concentration of the brine will be low i.e. <15% $CaCl_2$ and hence valve 25 is closed whereby brine is withdrawn from settling tank 18 and fed directly into the mixing tank for recycle which is continued until the concentration of the brine in the scrubbing medium reaches the desired level as determined by sampling or the like. Thereafter the valve 25 is opened and adjusted in accordance with the flow rates of gas and scrubbing medium to maintain the desired concentration level, i.e. about 15% $CaCl_2$. The concentrated brine, bled-off via pipeline 24, may be sent directly to mother liquor for desulfating the latter, or to storage as the case may be. Feed pipes 27 and 28 are provided at the mixing tank for adding make-up water and dry oolitic sand thereto which tank is provided with power operated mixing means indicated at 29 which is adapted to form fresh mixtures of oolitic sand and brine in proportions to be readily pumpable, and to recycle the fresh scrubbing medium to the upper end of the scrub tower by way of return pipe 30 for scrubbing additional waste gases.

The following examples will serve to further illustrate the invention:

EXAMPLE I

The scrub tower 10 was a cylinder four inches in diameter by four feet high with six sets of disc-donut-contractor plates. The recycle system included a wire mesh screen 14 (+65 mesh) located immediately below the discharge end of the scrub tower and arranged at an angle of 45° to its vertical axis. The screen overlay the upper open end of a brine collecting vessel 16, connected by piping to a brine clarifier 18, and served to separate and discharge any relatively coarse oolitic sand in the brine into a mixing tank 15 approximately two feet in diameter by four feet high and provided with a pump (not shown) capable of recycling the scrubbing medium to the tower at a rate of about 1 g.p.m.

The waste gas mixture comprised about 0.31% HCl, 2.45% $CO_2$ the balance air and water vapor; and the scrubbing medium comprised a slurry of oolitic sand (86.7% $CaCO_3$) and calcium chloride brine (15% $CaCl_2$) in the proportion of about 1% oolitic sand and 99% brine. The scrubbing medium was fed into the top of the scrub tower and recycled at a constant rate of 0.77 g.p.m. and at an average temperature of 86° F. The gas was fed counter-currently into the bottom of the scrub tower at a steady rate of 11.1 s.c.f.m.

At the start of the run the pH of the scrubbing medium was above about 10.1 but after 15 minutes the pH dropped to 6.2 and in five minutes to 5.9 where it remained substantially constant for the duration of the run. The pressure drop in the tower was 7.0 inches $H_2O$. The total time of the run was thirty minutes during which 100% of the HCl was removed from the waste gases and converted to $CaCl_2$ which was recycled to insure a $CaCl_2$ concentration of at least 15% for desulfating mother liquor. There was no evidence of calcium carbonate deposits in the scrub tower.

EXAMPLE II

Another run was made under conditions similar to those used in Example I except that in Example II the scrubbing medium comprised about 0.25% oolitic sand and the balance at 15% $CaCl_2$ brine. The pH of the scrubbing medium was initially above about 10.2 but after 20 minutes had dropped to about 6.8. The run was continued for 40 minutes during which time the pH of the scrubbing medium stabilized at about 5.8. The gas flow rate was 11.8 s.c.f.m. and the scrubbing medium circulated through the scrub tower at the rate of 0.80 g.p.m. The temperature within the tower was in the range from 95–86° F. and the pressure drop throughout the run was about 5.3 inches of $H_2O$. 100% of the HCl was removed from the waste gases and a clarified brine of about 15% $CaCl_2$ was formed for desulfating mother liquor.

EXAMPLE III

A counter current flow scrubbing tower 6 inches inside diameter and 50 inches high was packed 48 inches high with flexi-rings. The waste gas, at ambient temperature, analyzed 0.39 weight percent HCl and 2.90 weight percent $CO_2$, the balance air, and was fed upwardly through the tower at the rate of 2.5 s.c.f.m. The scrubbing medium consisted of 29,500 gms. of 15 weight percent $CaCl_2$ brine and 196 grams +48 oolitic sand, and was fed downwardly through the tower at the rate 1.75 g.p.m. The pH range of the scrubbing medium was 5.6 and substantially 100% of the HCl was recovered from the gases as $CaCl_2$ brine together with about 10.27% of the $CO_2$. The brine formed initially was bled off at a rate such that the brine being recycled attained a concentration of about 15% $CaCl_2$.

EXAMPLE IV

Another run was made using the counter current tower of Example III in which run the scrubbing medium consisted of 20,411 gms. of 15% weight percent calcium chloride brine and 170 gms. of +48 mesh oolitic sand. The gas which comprised 3.22 weight percent $CO_2$, 0.57 weight percent HCl balance air was fed into the bottom of the tower at 25 s.c.f.m. The liquid flow rate of the scrubbing medium was 1.14 g.p.m. and the pH about 5.6. The temperature of the recycled scrubbing medium was 140° F. Under these operating conditions 100% of the HCl in the gases was converted to $CaCl_2$ brine but none of the $CO_2$ was scrubbed from the gases. Apparently increasing the temperature of the scrubbing medium lowers the amount of $CO_2$ absorbed.

From the foregoing description and examples it will be seen that the invention provides a relatively simple, inexpensive method and means for scrubbing 100% of the hydrogen chloride from waste gases containing relatively small amounts of hydrogen chloride, carbon dioxide, balance air wherein the gases are brought into contact with a continuously recycled scrubbing medium consisting of a slurry of oolitic sand ($CaCO_3$) and $CaCl_2$ brine of 15% $CaCl_2$ or higher, as the case may be; and that by contact of the gases with the scrubbing medium the HCl in the gases is scrubbed out as a calcium chloride brine which is bled off and recycled at a rate to produce a brine of at least 15% $CaCl_2$ for recycling to scrub additional gases—and for feeding directly to mother liquor for desulfating the latter. Moreover, no deposits of $CaCO_3$ are formed in the scrub tower and hence the cyclic operation may be carried out continuously and at high efficiencies.

The scrubbing medium may comprise, for example from 0.25 to 5.0% oolitic sand and the waste gases, for example, may comprise from 0.11–1.80% HCl, from 2.43–3.37% $CO_2$ and the balance air.

The invention may be carried out in other specific ways than those herein set forth without departing from the essential characteristics of the invention, and the present embodiment is therefore to be considered in all respects as illustrative and not restrictive, and all changes coming within the meaning and equivalency range of the appended claims are intended to be embraced therein.

What is claimed is:

1. A cyclic process for scrubbing waste gases containing hydrogen chloride, carbon dioxide and balance air to remove the chloride values therefrom as calcium chloride brine comprising the steps of: contacting said waste gases with a scrubbing medium comprising a slurry of insoluble calcium carbonate and calcium chloride brine at a pH above about 3 but not exceeding 7 to convert the hydrogen chloride in said gases to newly formed calcium chloride brine in said scrubbing medium and increasing the concentration of said brine by separating the insoluble calcium carbonate from the calcium chloride brine, returning a portion of the calcium chloride brine, plus water to the separated calcium carbonate, to form fresh scrubbing medium and recycling the fresh scrubbing medium into contact with said waste gases to form additional calcium chloride brine.

2. A cyclic process for scrubbing waste gases according to claim 1 wherein said insoluble calcium carbonate is oolitic sand.

3. A cyclic process for scrubbing waste gases according to claim 2 wherein the scrubbing medium comprises from 0.25 to 5.0% oolitic sand.

4. A cyclic process for scrubbing waste gases according to claim 3 wherein contact between said waste gases and said scrubbing medium is effected by maintaining countercurrent flow of said waste gases and said scrubbing medium, respectively.

5. A cyclic process for scrubbing waste gases according to claim 4 wherein countercurrent flow of said waste gases and said scrubbing medium is effected by passing said scrubbing medium downwardly through a scrub tower and said waste gases upwardly therein whereby said waste gases continuously contact fresh scrubbing medium.

6. A cyclic process for scrubbing waste gases according to claim 3 wherein said waste gases comprises from 0.11–1.80% HCl, from 2.45–3.37% $CO_2$ and the balance air.

7. In a method for selective recovery of anhydrous magnesium chloride from sodium, potassium, magnesium chloride and sulfate containing mixed salt solutions wherein said mixed salt solution is concentrated in successive stages to produce a mother liquor comprising predominately chloride and sulfate salts of magnesium which mother liquor is desulfated by the addition of calcium chloride to produce a concentrated solution of predominately magnesium chloride the latter being further concentrated by heating and thereafter dehydrated by spray drying in the course of which waste gases are produced containing HCl, $CO_2$, and the balance air, the improvement comprising: removing the HCl from said waste gases by contacting said waste gases with a scrubbing medium comprising a slurry of insoluble calcium carbonate and calcium chloride brine at a pH above about 3 but not exceeding 7 to convert the hydrogen chloride in said gases to newly formed calcium chloride brine in said scrubbing medium, and increasing the concentration of said brine by separating the insoluble calcium carbonate from the calcium chloride brine, returning a portion of the calcium chloride brine, plus water, to the separated calcium carbonate to form fresh scrubbing medium, and recycling the fresh scrubbing medium into contact with said waste gases to form additional calcium chloride brine.

References Cited
UNITED STATES PATENTS

| | | | |
|---|---|---|---|
| 2,857,244 | 10/1958 | Graves | 423—497 |
| 3,516,785 | 6/1970 | Smith | 423—498 X |

EDWARD STERN, Primary Examiner

U.S. Cl. X.R.

423—158, 481, 488, 497